United States Patent [19]

Tokoro et al.

[11] Patent Number: 5,076,225
[45] Date of Patent: Dec. 31, 1991

[54] PISTON FOR AN INTERNAL COMBUSTION ENGINE

[75] Inventors: Noriyuki Tokoro, Gotenba; Roichi Shimura, Susono; Youichi Sugiura, Toyota, all of Japan

[73] Assignee: Toyota Jidosha Kabushiki Kaisha, Toyota, Japan

[21] Appl. No.: 634,563

[22] Filed: Dec. 27, 1990

[30] Foreign Application Priority Data

Dec. 28, 1989 [JP] Japan ............................. 1-150050[U]
Jan. 10, 1990 [JP] Japan ............................. 2-558[U]
Dec. 18, 1990 [JP] Japan ............................. 2-411286

[51] Int. Cl.$^5$ ................................................ F16J 1/00
[52] U.S. Cl. .................................. 123/193 R; 92/208; 92/227
[58] Field of Search ............... 123/193 P; 92/225, 226, 92/227, 228, 208

[56] References Cited

U.S. PATENT DOCUMENTS 1,475,520 11/1923 Sorel ................................ 92/227
1,794,827 3/1931 Best et al. ........................ 92/227

FOREIGN PATENT DOCUMENTS 55-54545 4/1980 Japan.
58-180353 12/1983 Japan.
62-85152 4/1987 Japan.
1-44346 3/1989 Japan.

Primary Examiner—Andrew M. Dolinar
Assistant Examiner—M. Macy
Attorney, Agent, or Firm—Kenyon & Kenyon

[57] ABSTRACT

A piston 2 for an internal combustion engine includes side wall portions 12 connecting skirt portions 10 to pin boss portions 6 so as to support the skirt portions 10 in a direction perpendicular to an axis 8 of the pin boss portions. The skirt supporting stiffness of each side wall portion 12 is gradually changed in an axial direction of the piston 2 so as to have a maximum stiffness at a lower end portion of the side wall portions b 12 and to decrease in the direction upwardly away from the lower end portion of the side wall portion 12. Due to this structure, the skirt portion 10 is unlikely to be deformed at its lower end portion so that a clearance between the skirt portion 10 and a cylinder bore surface 20 is maintained small. Further, the skirt portion 10 has a soft structure at the shoulder of the skirt portion 10 so that a shock at the shoulder will be decreased to prevent breakage of an oil membrane from happening at the upper portion of the skirt portion 10.

9 Claims, 5 Drawing Sheets

PISTON FOR AN INTERNAL COMBUSTION ENGINE

BACKGROUND OF THE INVENTION

1. Field of the Invention

The present invention relates to a piston for an internal combustion engine.

2. Description of the Prior Art

A new piston usually has a smaller diameter at a shoulder of a skirt portion than at a lower portion of the skirt portion for the purpose of absorbing the large thermal expansion of the shoulder portion.

However, after repeated impacts against a cylinder bore surface the piston becomes deformed radially inwardly at the lower portion of the skirt portion, as shown in FIG. 15, from configuration A to configuration B. At this time, the piston will impact against the cylinder bore surface at the shoulder portion C of the skirt portion also. Since a clearance between the shoulder portion and the cylinder bore surface is large, impact forces and slapping noise will be increased.

To prevent the clearance between the skirt portion and the cylinder bore surface from increasing, it is useful to increase radial stiffness of the skirt portion. However, if the stiffness of the skirt portion is increased, the shock occurring at the shoulder portion of the skirt portion after the lower portion of the skirt portion finally is deformed will become large, and an oil film formed between the shoulder portion and the cylinder bore surface will rupture to cause scuffing.

SUMMARY OF THE INVENTION

An object of the invention is to provide a piston for an internal combustion engine wherein deformation of the lower portion of the skirt portion and scuffing at the shoulder portion of the skirt portion are prevented from occurring.

In accordance with the present invention, this object can be attained by a piston for an internal combustion engine which includes a cylindrical top portion having an axis that defines an axis of the piston, two pin boss portions located below the top portion on opposite sides of the axis of the top portion and integrally connected to the top portion, the pin boss portions having an axis extending perpendicular to the axis of the piston, two skirt portions located below the top portion on opposite sides of the axis of the pin boss portions and connected to the top portion, and side wall portions located below the top portion between the pin boss portions and the skirt portions and connecting the pin boss portions and the skirt portions so as to connect the skirt portions the pin boss portions in directions substantially perpendicular to the axis of the pin boss portions. Skirt supporting stiffness of the side wall portions increases gradually in an axial direction from the top portion of the piston so as to have a maximum stiffness at a lower end portion of the side wall portion.

The large stiffness of the lower end portion of the side wall portion suppresses deformation of the lower portion of the skirt portion and the small stiffness of the upper portion of the side wall portion decreases impact shock at the shoulder portion of the skirt portion.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the following accompanying drawings, in which.

DETAILED DESCRIPTION OF THE PREFERRED EMBODIMENTS

Figure 1:
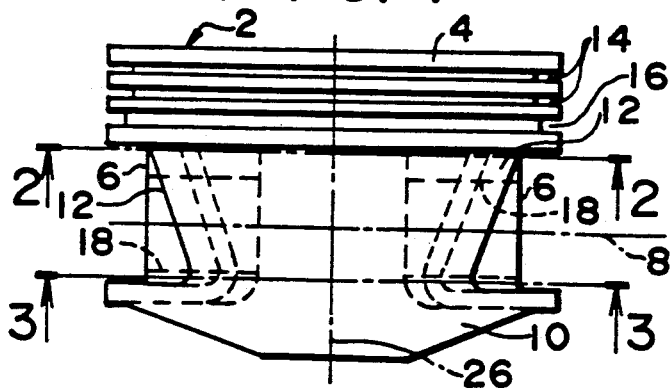
FIG. 1 is a side elevational view of a piston for an internal combustion engine in accordance with a first embodiment of the invention.

Four embodiments will be illustrated. Firstly, structures common to every embodiment will be explained with reference to FIGS. 1 to 3. Like structural members are denoted with like reference numerals throughout all the embodiments.

A piston 2 for an internal combustion engine includes a top portion 4, two pin boss portions 6, two skirt portions 10, and four side wall portions 12. The top portion 4 has an axis identical to an axis 26 of the piston. A piston-ring groove 14 and an oil ring groove 16 are formed in a radially outer portion of the top portion 4. The pin boss portions 6 are located below the top portion 4 on opposite sides of the axis 8 of the piston and are integrally connected to the top portion 4. Each pin boss portion 6 has a piston-pin hole 18 where a piston-pin is inserted. The pin boss portions 6 have an axis 8 extending perpendicular to the axis 26 of the piston so that the piston 2 can pivot around the axis 8. The skirt portions 10 are located below the top portion 4 on opposite sides of the axis 8 of the pin boss portions and are connected to the top portion 4. The side wall portions 12 are located below the top portion 4 between the pin boss portions 6 and the skirt portions 10. The side wall portions 12 connect the pin boss portions 6 circumferentially to the skirt portions 10 so as to support the skirt portions 10 from the pin boss portions 6 in a direction substantially perpendicular to the axis 8 of the pin boss portions.

Figure 13:
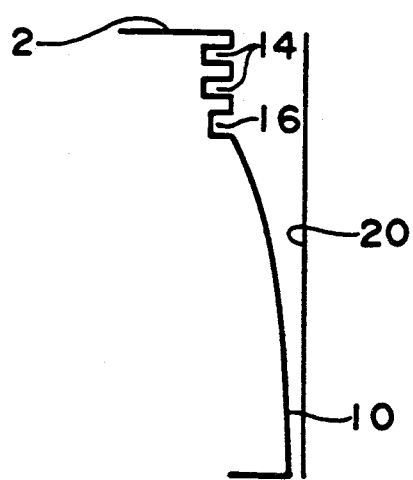
FIG. 13 is a schematic, partial elevational view of a piston in accordance with any embodiment of the first through fourth embodiments of the invention.
Figure 14:
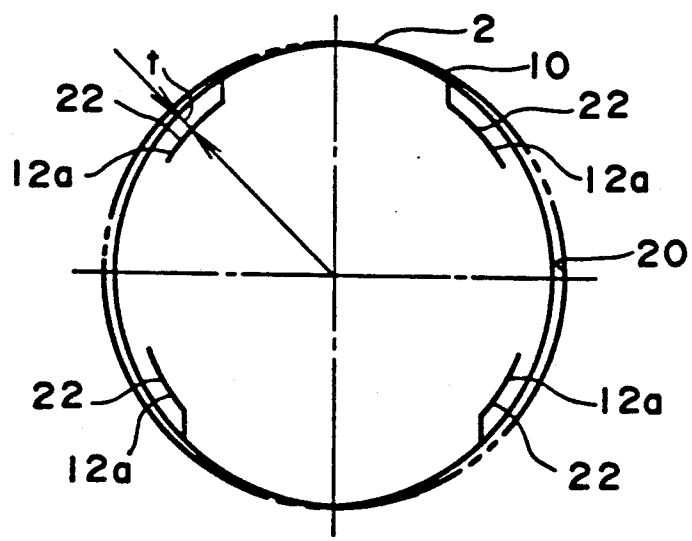
FIG. 14 is a schematic plane view of a piston in accordance with any embodiment of the first through fourth embodiments of the invention.
Figure 15:
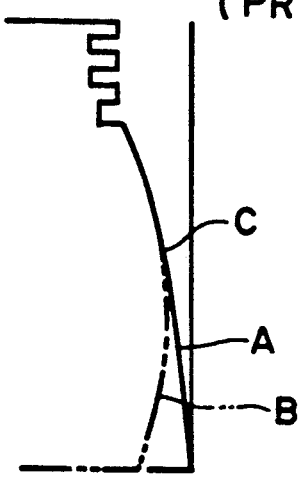
FIG. 15 is a schematic, partial elevational view of a piston illustrating a deformation of the lower skirt portion.

Since the piston 2 receives heat from a combustion chamber of an engine at the top portion 4, the top portion 4 experiences the largest thermal expansion. To prevent interference from occurring between the skirt portions and the cylinder bore surface due to the thermal expansion, the piston 2 is constructed to have a minimum diameter at the top portion 4 and a maximum diameter at the lower end of the skirt portion 10, as shown in FIG. 13. The attitude of the piston 2 is held by the sliding contact of the skirt portions with the cylinder bore surface 20. Further, to maintain an oil film between the skirt portion 10 and the cylinder bore surface 20, the outer surfaces of the skirt portions 10 are configured to be slightly oval in cross section as shown in FIG. 14.

Skirt supporting stiffness of the side wall portions 12 in the direction perpendicular to the axis 8 of the pin boss portions gradually increases in an axial direction from the top portion of the piston so as to have a maximum stiffness at a lower end portion of the side wall portions 12. The variable stiffness structures of the several embodiments differ from each other. Structures specific to each embodiment will be explained below.

First Embodiment

Figure 2:
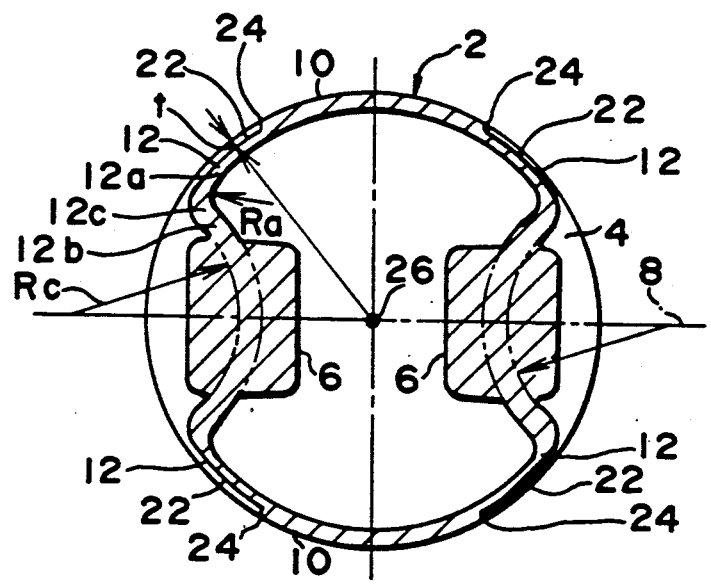
FIG. 2 is a cross-sectional view of the piston of FIG. 1 taken along line 2—2 of FIG. 1.
Figure 3:
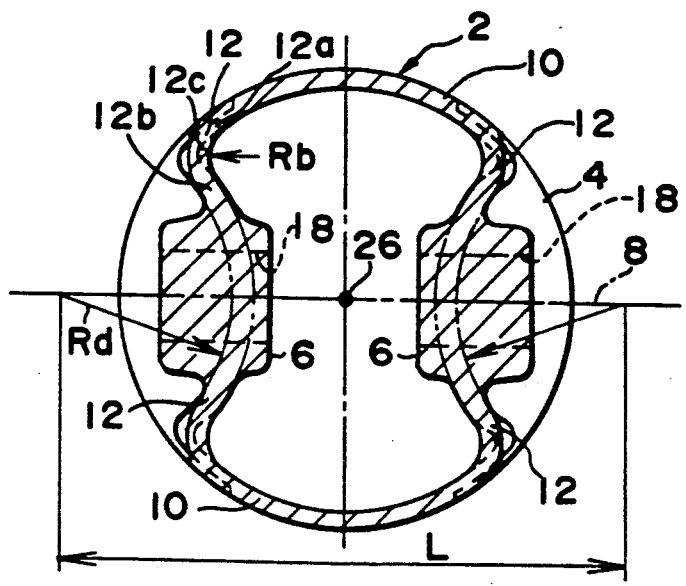
FIG. 3 is a cross-sectional view of the piston of FIG. 1 taken along line 3—3 of FIG. 1.

FIGS. 1 to 3 illustrate the piston in accordance with the first embodiment. Each side wall portion 12 includes a first portion 12a having a first end connected to an adjacent skirt portion and an opposite second end, a second portion 12b having a first end connected to an adjacent pin boss portion 6 and an opposite second end, and a third portion 12c connecting the second end of the first portion 12a and the second end of the second portion 12b when viewed in a plane perpendicular to the axis 26 of the piston (see, for example, FIGS. 2 and 3). The third portion 12c has a curved cross section in the plane perpendicular to the axis 26 of the piston concave in a radially inward direction. A radius of curvature of the third portion 12c changes gradually in the axial direction of the piston so as to decrease in the direction upwardly away from the lower portion of the side wall portion 12. Therefore, radius of curvature Ra of the third portion 12c at the upper portion of the side wall portion 12 is smallest (FIG. 2) and radius of curvature Rb of the third portion 12c at the lower portion of the side wall portion 12 is largest.

Since lateral loads from the cylinder bore surface 20 are borne by each skirt portion 10 and the two associated first portions 12a at the upper portion of the skirt portion 10, the skirt portion 10 and the associated first portions 12a can be treated as a beam supported at opposite ends thereof. In this instance, when the span between the opposite supporting points is small, the beam is relatively rigid, and when the span is large, the beam is relatively soft. As illustrated in FIG. 2, the radius Ra is small and the arc length including the skirt portion 10 and the associated first portions 12a is long; so the stiffness of the skirt portion 10 in the direction perpendicular to the axis 8 of the pin boss portion is relatively small. In the case of FIG. 2, opposite third portions 12c constitute opposite supporting points for the beam. In contrast, as illustrated in FIG. 3, the radius Rb is large and the arc length including the skirt portion 10 is short; so the stiffness of the skirt portion 10 in the direction perpendicular to the axis 8 of the pin boss portion is relatively large. In the case of FIG. 3, opposite first portions 12a constitute the opposite supporting points for the beam. As a result, the lower portion of the skirt portion 10 is relatively rigidly supported and the shoulder portion of the skirt portion 10 is relatively softly supported in the lateral direction.

Also, the second portion 12b may be configured to be an arc having a center of curvature outside the side wall portion 12 in the plane perpendicular to the axis 26 of the piston. A distance L between centers of curvature of second portions 12b located on opposite sides of the axis 26 of the piston increases gradually in the axial direction of the piston upwardly away from the lower end portion of the side wall portion 12. Further, the radius of curvature of the second portions 12b may decrease gradually in the axial direction of the piston upwardly away from the lower end portion of the side wall portion 12. These structures can lengthen the span between the opposite supporting points at the upper portion of the beam and can shorten the span between the opposite supporting points at the lower portion of the beam. Therefore, due to these structures the skirt portion 10 is further stiffened at the lower portion thereof and is further softened at the upper portion thereof.

Each first portion 12a is configured to be an arc concave in a radially inward direction when viewed in a plane perpendicular to the axis 26 of the piston. An outside surface 22 of each first portion 12a recedes radially inward from a circumferential extension of an outside surface of the skirt portion 10. In FIG. 2 each first portion 12a starts at a step portion 24. A radial distance t between the outside surface 22 of the first portion 12a of each side wall portion 12 and the extension of the outside surface of the skirt portion 10 is constant in a circumferential direction of the piston.

The outside surface 22 of each first portion 12a functions as an oil film forming surface for holding oil between the surface 22 and the cylinder bore surface 20. The oil will be supplied to the clearance between the skirt portion 10 and the cylinder bore surface 20 to prevent rupture of the oil film and scuffing from occurring at the shoulder of the skirt portion 10.

Since the clearance t between the outside surface 22 of each first portion 12a and the cylinder bore surface 20 is constant along the first portion 12a, the heat transmitting characteristic of the oil film is constant along the first portion 12a, and the shoulder portion of the skirt portion 10 is evenly cooled. In addition to the support structure of the side wall portion 12 for softly supporting the shoulder portion of the skirt portion 10, the sufficient oil supply and the even cooling will further prevent scuffing from happening.

Second Embodiment

Figure 4:
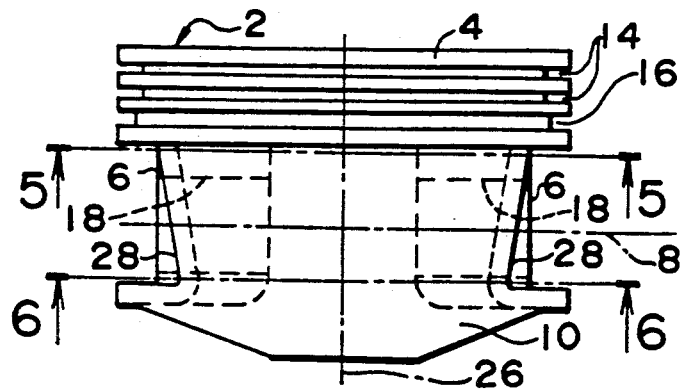
FIG. 4 is a side elevational view of a piston for an internal combustion engine in accordance with a second embodiment of the invention.
Figure 5:
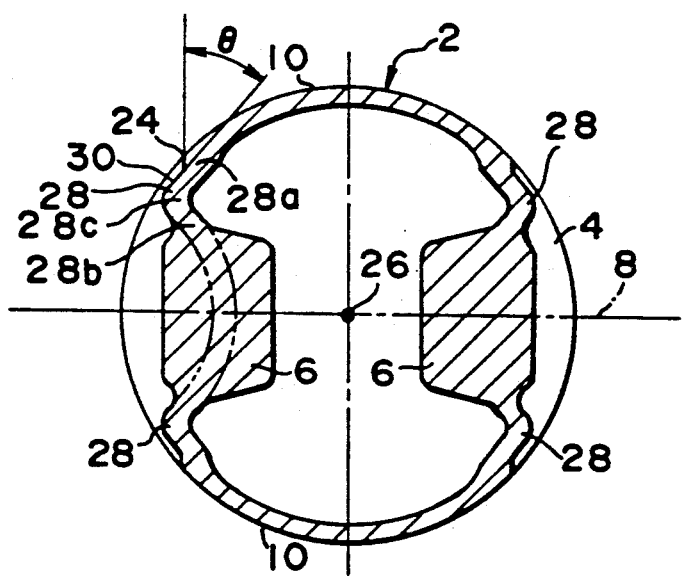
FIG. 5 is a cross-sectional view of the piston of FIG. 4 taken along line 5—5 of FIG. 4.
Figure 6:
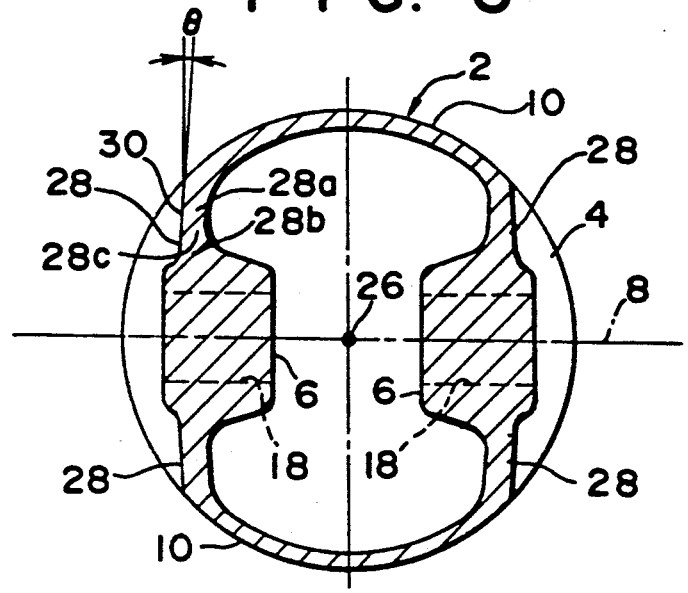
FIG. 6 is a cross-sectional view of the piston of FIG. 4 taken along line 6—6 of FIG. 4.

FIGS. 4 to 6 illustrate a piston for an internal combustion engine in accordance with the second embodiment. In the second embodiment, each of four side wall portions 28, which correspond to the side wall portions 12 of the first embodiment, includes a first portion 28a connected to the skirt portion 10, an opposite second portion 28b connected to the pin boss portion 6, and a third portion 28c connecting the first portion 28a and the second portion 28b. Each first portion 28a has a straight extending outside surface 30 (corresponding to the surface 22 of the first embodiment, though the surface 22 is an arcuate surface) in a plane perpendicular to the axis 26 of the piston. Each second portion 28b is configured to be an arc. An angle $\theta$ defined between the outside surface 30 of each first portion 28a and a direction perpendicular to the axis 8 of the pin boss portions gradually increases in the axial direction of the piston upwardly away from the lower end portion of the side wall portion 28.

The piston of the second embodiment has a function very similar to that of the piston of the first embodiment. More particularly, due to the changing angle, the first portions 28a connected to the skirt portion 10 tend to function at the upper portion of the side wall portion 28 as one portion of the lateral force bearing beam which includes the skirt portion 10, the span between opposite beam supporting points is largest at the upper portion of the side wall portion 28 as shown in FIG. 5, and smallest at the lower portion of the side wall portion 28 as shown in FIG. 6. In this instance, the upper portion of the beam including the skirt portion 10 and the associated first portions 28a is deemed to be supported by the third portions 28c and the lower portion of the beam including the skirt portion 28 is deemed to be supported by the first portions 28a.

Third Embodiment

Figure 7:
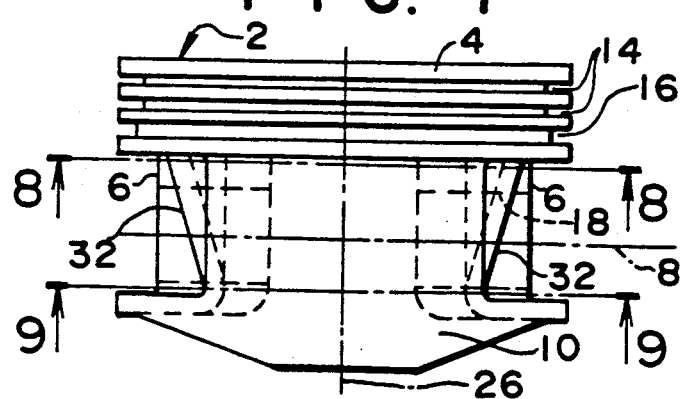
FIG. 7 is a side elevational view of a piston for an internal combustion engine in accordance with a third embodiment of the invention.
Figure 8:
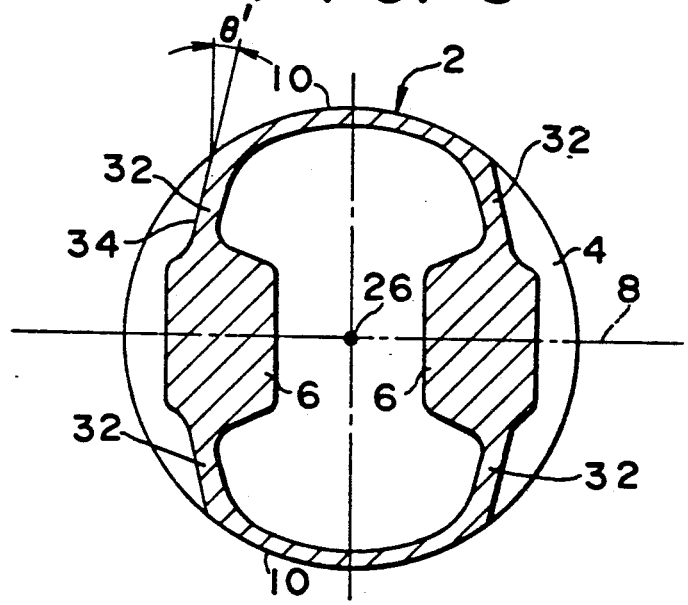
FIG. 8 is a cross-sectional view of the piston of FIG. 7 taken along line 8—8 of FIG. 7.
Figure 9:
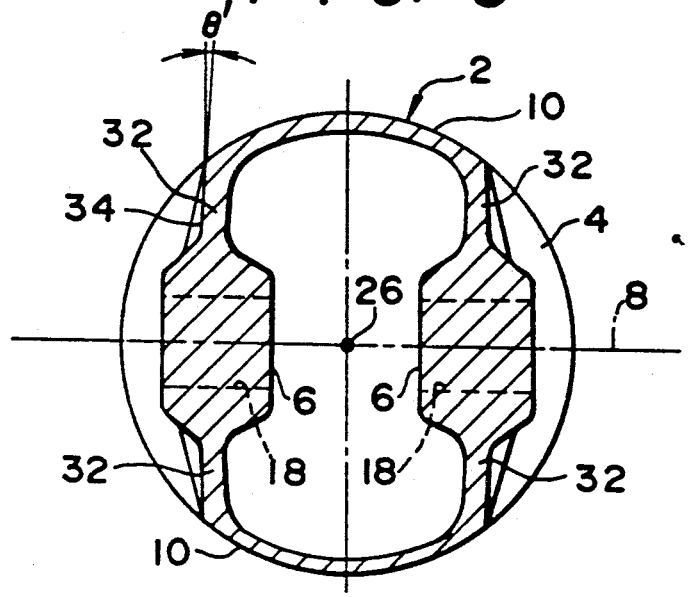
FIG. 9 is a cross-sectional view of the piston of FIG. 7 taken along line 9—9 of FIG. 7.

FIGS. 7 to 9 illustrate a piston for an internal combustion engine in accordance with the third embodiment of the invention. In the third embodiment, each of four side wall portions 32 extends straight from the skirt portion 10 to the pin boss portion 6. Each side wall portion 32 has a straight extending surface 34. An angle θ defined between each side wall portion 32 (exactly, the outside surface 34 of the side wall portion 32) and a direction perpendicular to the axis 8 of the pin boss portions decreases gradually in the axial direction of the piston upwardly away from the lower portion of the side wall portion 32.

Also in the third embodiment, the span between opposite beam supporting points is largest at the upper portion of the side wall portion 32 because the upper portion of the beam includes the skirt portion 10 and the associated side wall portions 32 as shown in FIG. 8, and smallest at the lower portion of the side wall portion 32 because the lower portion of the beam includes the skirt portion 10 only as shown in FIG. 9.

Fourth Embodiment

Figure 10:
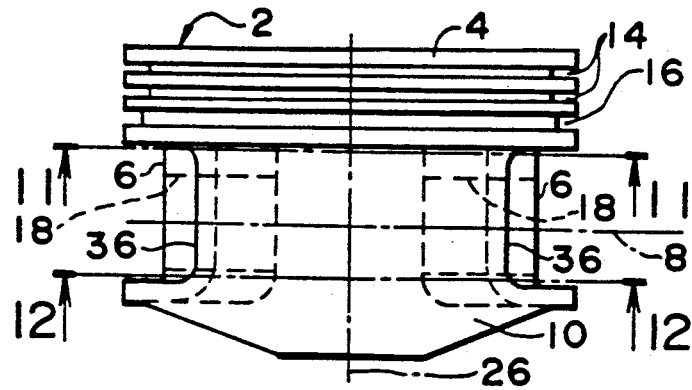
FIG. 10 is a side elevational view of a piston for an internal combustion engine in accordance with a fourth embodiment of the invention.
Figure 11:
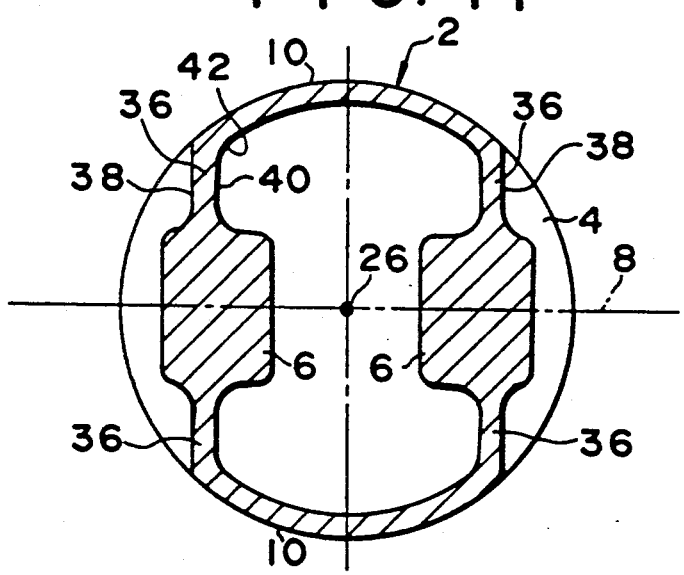
FIG. 11 is a cross-sectional view of the piston of FIG. 10 taken along line 11—11 of FIG. 10.
Figure 12:
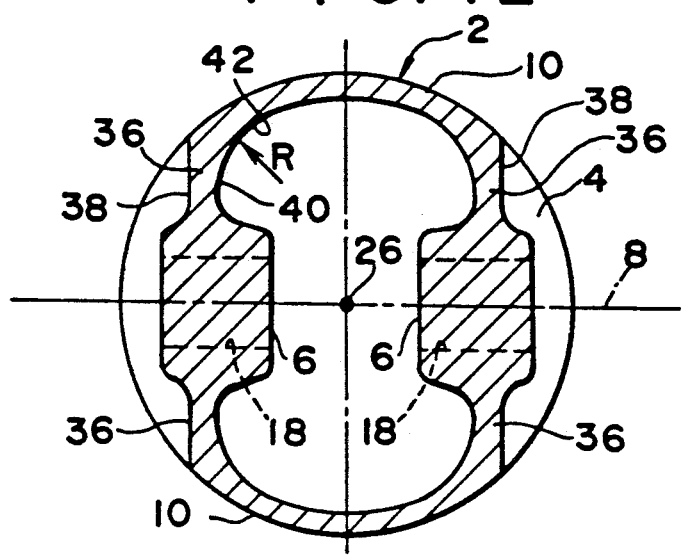
FIG. 12 is a cross-sectional view of the piston of FIG. 10 taken along line 12—12 of FIG. 10.

FIGS. 10 to 12 illustrate a piston for an internal combustion engine in accordance with the fourth embodiment of the invention. In the fourth embodiment, each of four side wall portions 36 has an outside surface 38 and an inside surface 40. The outside surface 38 of each side wall portion 36 extends straight from the pin boss portion 6 to the skirt portion 10. The inside surface 40 of each side wall portion 36 is connected to an inside surface of the skirt portion 10 via a curved surface 42 in a plane perpendicular to the axis 26 of the piston A radius R of curvature of the curved surface decreases gradually in the axial direction of the piston upwardly away from the lower portion of the side wall portion 36.

Due to the changing radius, a span between the supporting points for supporting each skirt portion 10 is largest at the upper portion of the side wall portion 36 as shown in FIG. 11, and smallest at the lower portion of the side wall portion 36 as shown in FIG. 12.

According to the present invention, the following effects are obtained.

Since each side wall portion has a largest skirt supporting stiffness at the lower portion, the piston is unlikely to be deformed at its lower portion and problems due to a deformation of the lower portion of the skirt portion can be suppressed.

Since each side wall portion has a smallest skirt supporting stiffness at the upper portion, an impact shock occurring at the shoulders of the skirt portions will be decreased so that rupture of an oil film and scuffing are effectively prevented.

Since each side wall portion has a smallest skirt supporting stiffness, it is unnecessary to reduce a diameter of the upper portion of the skirt portions for minimizing impact shock, though reduction in diameter of the shoulders of the skirt portions for allowing thermal expansion of the shoulder is necessary. Therefore, even if the lower portions of the skirt portions are deformed, an increase in clearance between the shoulders of the skirt portions and the cylinder bore surface is minimized to also minimize slap noise and to maintain a normal attitude of the piston during engine operation.

Since rupture of an oil film is prevented, heat of the piston can smoothly be released to the cylinder bore surface, and durability and reliability of the piston is increased.

Although only a few embodiments of the invention have been described in detail, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the present invention as defined by the following claims.

What is claimed is:

1. A piston for an internal combustion engine comprising:

a cylindrical top portion having an axis that defines an axis of the piston;

two pin boss portions located below the top portion on opposite sides of the axis of the piston and integrally connected to the top portion, the pin boss portions having an axis extending perpendicular to the axis of the piston;

two skirt portions located below the top portion on opposite sides of the axis of the pin boss portions and connected to the top portion; and side wall portions located below the top portion between the pin boss portions and the skirt portions and connecting the pin boss portions and the skirt portions so as to support the skirt portions from the pin boss portions in directions perpendicular to the axis of the pin boss portions, skirt supporting stiffness of each side wall portion being gradually changed in an axial direction of the piston as a result of the axially changing shape of the cross section of the piston, so as to have a maximum stiffness at lower portions of the side wall portions and to decrease in a direction upwardly away from the lower portions of the side wall portions.

2. The piston according to claim 1, wherein each side wall portion includes:

a first portion having a first end connected to an adjacent skirt portion and an opposite second end;

a second portion having a first end connected to an adjacent pin boss portion and an opposite second end; and a third portion connecting the second end of the first portion and the second end of the second portion in a plane perpendicular to the axis of the piston, the third portion having a curved cross section concave in a radially inward direction in the plane perpendicular to the axis of the piston, a radius of curvature of the third portion decreasing gradually in the axial direction of the piston upwardly away from the lower portion of the side wall portion.

3. The piston according to claim 2, wherein the first portion is configured to be an arc concave in a direction toward the axis of the piston in the plane perpendicular to the axis of the piston, an outside surface of the first portion receding from a circumferential extension of an outside surface of the skirt portion in the direction toward the axis of the piston in the plane perpendicular to the axis of the piston.

4. The piston according to claim 2, wherein the second portion is configured to be an arc having a center of curvature outside the side wall portion in the plane perpendicular to the axis of the piston, a distance between centers of curvature of second portions located on opposite sides of the axis of the piston increasing gradually in the axial direction of the piston upwardly away from the lower portion of the side wall portion.

5. The piston according to claim 2, wherein the second portion is configured to be an arc having a center of curvature outside the side wall portion in the plane perpendicular to the axis of the piston, a radius of curvature of the second portion decreasing gradually in the axial direction of the piston upwardly away from the lower portion of the side wall portion.

6. The piston according to claim 3, wherein a radial distance between the outside surface of the first portion of each side wall portion and the extension of the outside surface of the adjacent skirt portion is constant in a circumferential direction of the piston.

7. The piston according to claim 1, wherein each side wall portion includes a first portion connected to an adjacent skirt portion and an opposite second portion connected to an adjacent pin boss portion, the first portion having a straight extending outside surface in a plane perpendicular to the axis of the piston, the second portion being configured to be an arc, and an angle defined between the outside surface of the first portion and a direction perpendicular to the axis of the pin boss portions increasing gradually in the axial direction of the piston upwardly away from the lower end portion of the side wall portion.

8. The piston according to claim 1, wherein each side wall portion extends straight from the adjacent skirt portion to the adjacent pin boss portion, an angle defined between the side wall portion and a direction perpendicular to the axis of the pin boss portions increasing gradually in the axial direction of the piston upwardly away from the lower portion of the side wall portion.

9. The piston according to claim 1, wherein each side wall portion has an outside surface and an inside surface, the outside surface of the side wall portion extends straight from the adjacent pin boss portion to the adjacent skirt portion, the inside surface of each side wall portion being connected to an inside surface of the adjacent skirt portion via a curved surface in a plane perpendicular to the axis of the piston, a radius of curvature of the curved surface decreasing gradually in the axial direction of the piston upwardly away from the lower portion of the side wall portion.

* * * * *